United States Patent [19]

Tajima et al.

[11] Patent Number: 4,943,906
[45] Date of Patent: Jul. 24, 1990

[54] DATA SETTING DEVICE FOR AN EMBROIDERING MACHINE

[75] Inventors: Ikuo Tajima; Hideo Hasegawa, both of Kasugai, Japan

[73] Assignee: Tokai Kogyo Mishin Kabushiki Kaisha, Kasugai, Japan

[21] Appl. No.: 217,838

[22] Filed: Jul. 12, 1988

[30] Foreign Application Priority Data

Jul. 14, 1987 [JP] Japan .................................. 62-173805
Dec. 23, 1987 [JP] Japan .................................. 62-323868
Jun. 3, 1988 [JP] Japan .................................. 63-135642

[51] Int. Cl.$^5$ .......................... D05B 3/02; G06F 15/46
[52] U.S. Cl. ..................................... 364/188; 364/189; 364/474.22; 112/121.11; 112/458
[58] Field of Search ........... 364/180, 188, 189, 474.22, 364/146, 474.23; 112/121.11, 453, 456, 457, 458, 445

[56] References Cited

U.S. PATENT DOCUMENTS

| 4,135,461 | 1/1979 | Sedlatschek ..................... 112/158 E |
| 4,499,836 | 2/1985 | Meier et al. ..................... 112/158 E |
| 4,512,271 | 4/1985 | Herdeg et al. ................... 112/158 E |
| 4,524,414 | 6/1985 | Kiyokawa .......................... 364/171 |
| 4,622,907 | 11/1986 | Kimura .......................... 112/121.12 |
| 4,688,503 | 8/1987 | Kato ..................................... 112/445 |

Primary Examiner—Jerry Smith
Assistant Examiner—Paul Gordon
Attorney, Agent, or Firm—Spensley Horn Jubas & Lubitz

[57] ABSTRACT

An embroidering machine or other sewing machine generally has a large number of data setting and selection functions. In this invention, function switches of a predetermined number which is smaller than the number of setting and selection functions are provided and a setting or selection function to be assigned to each of the function switches is switched. A display for explaining setting and selection functions which are currently assigned to each function switch is made. This function explanation display may be made by characters or by figures symbolizing these functions. Further, switch patterns may be displayed on a screen of a display device in a desired arrangement and a switch pattern corresponding to a desired setting or selection function to be selected may be selected and designated by designating the position of the switch pattern in the screen.

10 Claims, 16 Drawing Sheets

FIG.4a

| F1 | F2 | F3 | F4 | F5 | F6 |
|---|---|---|---|---|---|
| A: DATA INPUT | B: PROCON | C: DATA CONVER. | D: OFFSET | E: HEAD SELECT. | NEXT |

FIG.4b

| F1 | F2 | F3 | F4 | F5 | F6 |
|---|---|---|---|---|---|
| F: PACK | G: READ START | H: DESIGN PROCON | I: REPEAT | J: AFC | NEXT |

FIG.4c

| F1 | F2 | F3 | F4 | F5 | F6 |
|---|---|---|---|---|---|
| K: MEMORY EDITING | L: PARAM. SET | | | | NEXT |

FIG.4d

| F1 | F2 | F3 | F4 | F5 | F6 |
|---|---|---|---|---|---|
| MEMORY | PTR | RS-232C | | | |

PROGRAM MODE MENU SCREEN PATTERN

DATA INPUT SCREEN PATTERN

EXAMPLE OF SCREEN PATTERN IN RUNNING MODE

DATA SETTING DEVICE FOR AN EMBROIDERING MACHINE

BACKGROUND OF THE INVENTION

This invention relates to a data setting device for an embroidering machine or other sewing machine and, more particularly, to a data setting device capable of switching setting and selection functions to be assigned to function switches and also displaying the assigned functions.

The invention relates also to a data setting device capable of displaying setting and selection functions assigned to these function switches in the form of symbols corresponding to the respective modes of these setting and selection functions.

The invention relates also to a data setting device in which a multi-function switch is constructed by the combination of a display screen pattern and input means for designating and inputting a desired position on the screen pattern.

Automatic embroidering machines have recently been added with complex functions such as reducing, enlarging, repeating and editing of design etc. applied to original data provided by means of a paper tape or the like. For coping with such complex functions, prior art automatic embroidering machines have provided function switches of a number equal to the number of functions, each function switch corresponding to a specific one of these functions. Alternatively, prior art automatic embroidering machines have utilized one function switch for plural modes used and explained about contents of functions to which the single switch corresponds in a handling manual or affixed description about all functions assigned to the single switch in the vicinity of the switch.

This first measure, however, necessitates an increase in the number of function switches as the number of function increases with resulting enlargement in the size of the device, increase in the manufacturing cost and inconvenience in handling. The second measure can reduce the number of the function switches as compared with the number of functions. According to the second measure, however, there arise the problems that the operator must memorize the contents of the functions corresponding to each function switch by heart and that, in a case where there is a large number of functions, necessary description cannot be made sufficiently due to limit in the space for writing characters in the vicinity of the switch.

SUMMARY OF THE INVENTION

It is, therefore, an object of the invention to provide a data setting device for an embroidering machine or other sewing machine capable of switching a setting or selection function to be assigned to each function switch and also capable of displaying a function which is currently assigned to each function switch with respect to each function switch.

In a case where explanation of setting and selection functions which are currently assigned to respective function switches is displayed by characters on a display device for convenience of the operator in his operation for setting functions, a language of a country in which the embroidering machine is used, e.g., Japanese, Korean, Chinese, English, French, German, Spanish or Italian, is used, country by country, for characters for explaining the setting and selection functions assigned to these function switches. If such explanation is displayed only by characters, it will become necessary, when an operator whose mother tongue is different from the language of the characters used for the explanation uses the automatic embroidering machine, to alter the display of explanation of the setting and selection functions of the function switches to one of the language which is the mother tongue of the operator. This poses the difficulty in manufacturing a common type of embroidering machines and resulting reduction in the manufacturing cost. There is also the problem that, if such alteration in the language used for explaining the functions of the function switches is not made, the operator who cannot understand the language display cannot understand the setting and selection functions of the function switches with resulting difficulty in proceeding with the embroidery work.

It is, therefore, a second object of the invention to provide a data setting devce for an embroidering machine or other sewing machine capable of displaying explanation of setting and selection functions which are currently assigned to function switches in the form of symbols on a display.

It is still another object of the invention to provide a data setting device for an embroidering machine and other sewing machine in which a multi-function switch is constructed with a simple design and setting and selection of various data can be easily made.

The data setting device achieving the above described object is characterized in that it comprises function switches of a predetermined number which is smaller than the number of setting and selection functions, switching means for switching a setting or selection function to be assigned to each of the function switches, function assignment means for assigning a predetermined setting or selection function to each of the function switches, contents to be assigned being switched in accordance with the switching operation by said switching means, and function display means for displaying, in accordance with the assignment by this function assignment means, a setting or selection function which is currently assigned to each of the function switches with respect to each of the function switches, a processing corresponding to the setting or selection function which is currently assigned to one of the function switches being designated in accordance with operation of said function switch.

In accordance with the switching operation by the switching means, a setting or selection function to be assigned to each of the function switches is switched. Display representing a setting or selection function which is currently assigned to each of the function switches in accordance with the assignment is made by the function display means. If a desired setting or selection function is to be selected, the desired setting or selection function is displayed by the function display means by the switching operation of the switching means. Upon displaying of the desired setting or selection function, a corresponding function switch is operated. The functon (i.e., the desired setting or selection function) which is currently assigned to the function switch which has been operated thereby is selected. Thus, desired data is set by selecting the desired setting or selection function.

The data setting device achieving the second object of the invention is characterized in that it comprises the function switches, switching means, function assignment means described above and, further, graphic pattern generation means for generating graphic pattern data of predetermined patterns symbolizing descriptions of the respective functions which are settable and selectible in correspondence to these functions, and function display means for receiving, in accordance with the assignment by said function assignment means, graphic pattern data corresponding to the setting or selection function which is currently assigned to each of the function switches from said graphic pattern generation means and displaying a pattern based on said graphic pattern data in correpondence to each of the function switches, a processing corresponding to the setting or selection function which is currently assigned to one of the function switches being designated in accordance with operation of said function switch.

The function display means receives, in accordance with the assignment by the function assignment means, graphic pattern data corresponding to the setting or selection function which is currently assigned to each of the function switches from the graphic pattern generation means and displays a pattern based on the graphic pattern data in correspondence to each of the function switches. Accordingly, contents of the setting and selection functions which are currently assigned to the respective function switches can be readily understood by the display of symbols in the function display means and, on the basis of this understanding, a function switch corresponding to a desired setting or selection function can be operated.

The data setting device achieving the further object of this invention is characterized in that it comprises a display for displaying characters and pictures, display control means for causing one or more switch patterns to be displayed on the screen of said display in accordance with a previously programmed switch pattern arrangement pattern, input means for performing an input operation for selectively designating the switch pattern displayed on the screen of said display, and judging means for judging which switch pattern on the screen of said display the switch pattern designated and inputted by said input means is, a processing being performed in accordance with the judgement of said judging means on the assumption that switch input corresponding to the function assigned to said switch pattern has been made.

The display can display a desired characters or picture and one or more switch patterns are displayed on the screen in accordance with a previously programmed switch pattern arrangement pattern. Upon designating the desired switch pattern displayed by the input means, the judgement means judges which switch pattern on the screen the switch pattern designated an inputted by the input means is. In accordance with this judgement, a processing is made on the assumption that switch relating this switch pattern has been turned on, i.e., switch input corresponding to the function assigned to the switch pattern has been made.

By switching the switch pattern arrangement pattern on the display (i.e., switching the picture on the display), various switching functions for setting and selecting various data in the sewing machine can be realized.

Preferred embodiments of the invention will be described below in conjunction with the accompanying drawings.

BRIEF DESCRIPTION OF THE DRAWINGS

In the accompanying drawings,

FIGS. 4a through 4d are diagrams showing specific examples of function display in the display in FIG. 3 corresponding to the respective function switches;

DESCRIPTION OF THE PREFERRED EMBODIMENTS

Figure 1A:
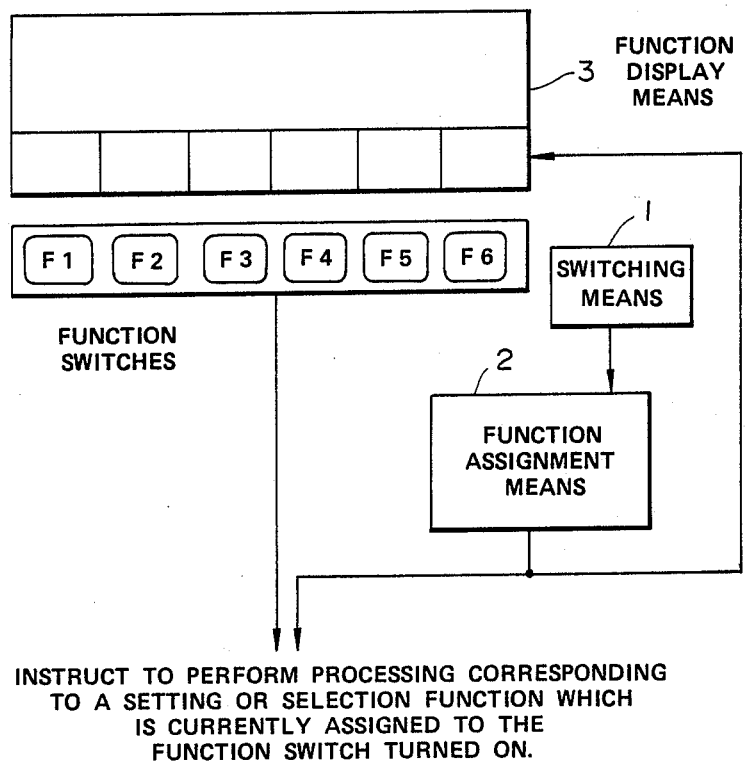
FIGS. 1a through 1c are functional block diagrams showing embodiments of the data setting device for an embroidering machine according to the invention.

FIG. 1a shows an outline of an embodiment of the data setting device for an embroidering machine or other sewing machine according to the invention. There are provided function switches F1-F6 of a predetermined number (e.g., 6) which is smaller than the number of various setting and selection functions. Function assignment means 2 switches setting and selection functions to be assigned to the function switches F1- F6 in accordance with switching operation by switching means 1. Display of a setting or selection function which is currently assigned to each of the function switches F1-F6 according to the assignment is made by function display means 3.

If a desired setting or selection function is to be selected, the desired setting or selection function is displayed by the function display means 3 by the switching operation of the switching means 1. Upon displaying of the desired setting or selection function, a corresponding function switch is operated. The function (i.e., the desired setting or selection function) which is currently assigned to the function switch which has been operated thereby is selected. Thus, desired data is set by selectng the desired setting or selection function.

By way of an example, the function display means 3 has display frames corresponding to the function switches and display of a character or characters representing the setting or selection function which is currently assigned to each of the function switches is made in each of the display frames.

The switching means 1 includes not only manual switching means depending upon manipulation of manual operation means but also switching processing means performing switching automatically in steps previously programmed in the process of data setting processing. In the embodiment to be described later also, what functions as the switching means 1 includes both the manual operation means and the automatic switching processing means. The manual operation means as the switching means 1 is not limited to a changeover switch for exclusive use but any of the function switches F1–F6 may be utilized. In the embodiment to be described also, one of the function switches F1–F6 is adapted to function as the switching means in a state in which a specific function is assigned.

Figure 1B:
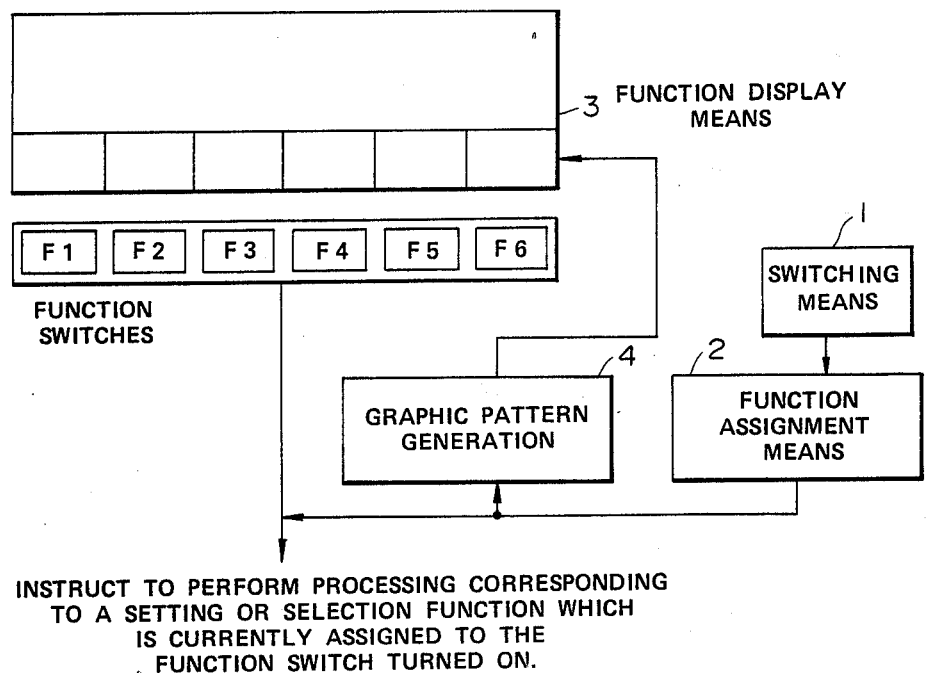

In the embodiment of FIG. 1b, there is provided graphic pattern generation means 4 for generating graphic pattern data of predetermined patterns symbolizing description of the respective settable and selectible functions in correspondence to these functions. The function display means 3 receives, in accordance with the assignment by the function assignment means 2, graphic pattern data corresponding to the setting or selection function which is currently assigned to each of the function switches F1–F6 from the graphic pattern generation means 4 and displays a pattern based on the graphic pattern data in correspondence to each of the function switches F1–F6. Some examples of such symbolic function explanation figure display corresponding to the respective function switches F1–F6 are shown in FIGS. 10a through 10e.

Contents of the setting and selection functions which are currently assigned to the respective function switches F1–F6 can be readily understood by the display of symbols in the function display means 3 and, on the basis of this understanding, a function switch (one of F1–F6) corresponding to a desired setting or selection function can be selectively operated.

Figure 1C:
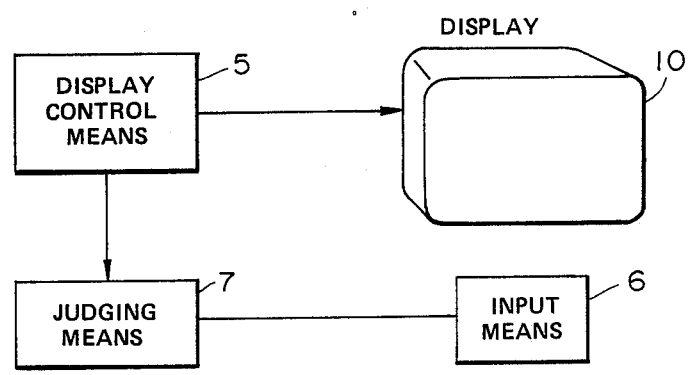

In the embodiment of FIG. 1c, a display 10 displays character and pictures. Display control means 5 performs control for causing one or more switch patterns to be displayed on the screen of the display 10 in accordance with a previously programmed switch pattern arrangement pattern. There is provided input means 6 for performing an input operation for selectively designating the switch pattern displayed on the screen of the display. Judging means 7 judges which switch pattern on the screen of the display the switch pattern designated and inputted by the input means 6 is. A processing is performed in accordance with the judgement on the assumption that the switch relating to the switch pattern has been turned on, i.e., switch input corresponding to the function assigned to said switch pattern has been made.

By switching the switch pattern arrangement on the display 10 (i.e., switching the picture on the display), various switching functions for setting and selecting various data on the sewing machine can be realized.

In one aspect of the invention, the display control means 5 may comprise a screen pattern memory prestoring a plurality of switch pattern arrangement patterns and read out one of the switch pattern arrangement patterns selectively from this screen pattern memory for causing switch patterns in the read out switch pattern arrangement pattern to be displayed by the display. The judging means 7 may judge the designated and inputted switch pattern by comparing and collating position of respective switch patterns in the one switch pattern arrangement pattern selected by the display control means 5 with the position on the screen of the display designated by the input means 6.

In one aspect of the invention, the input means 6 may comprise a matrix switch section in the form of a transparent sheet consisting of switch elements disposed in matrix form on the front surface of the display 10.

In another aspect of the invention, the input means 6 may comprise an optical type designating member (e.g., light pen or light gun) for designating a desired position on the screen of the display 10.

In still another aspect of the invention, the input means 6 may comprise means for generating cursor display on the screen of the display 10 and operation means for moving this cursor display to a desired position on the screen of the display 10 and a desired switch pattern may be designated by the position of the cursor display.

The input means 6 may be formed in other form if it can designate a desired position on the screen of the display 10.

Figure 2:
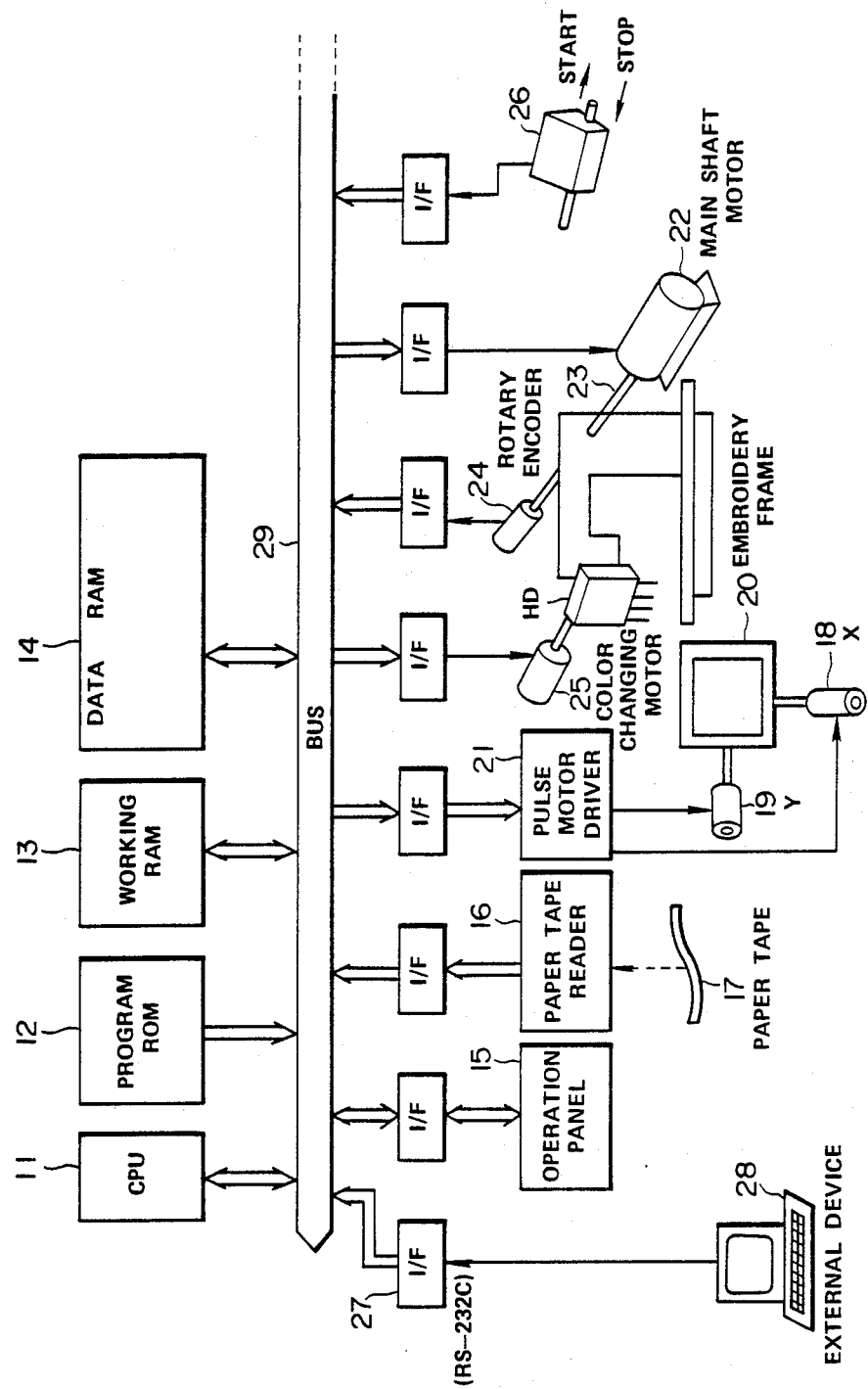
FIG. 2 is a block diagram of a hardware structure schematically showing a control system of an embodiment of an embroidering machine incorporating the data setting device according to the invention.

FIG. 2 is a diagram showing a hardware structure of an embodiment of the control system for an automatic embroidering machine according to the invention. The operation of the entire automatic embroidering machine is controlled by a microcomputer including a CPU 11, a program ROM 12 and a working RAM 13. A data RAM 14 stores various data including stitch data for realizing a desired embroidery design and other data relating to embroidery stitching.

An operation panel 15 inlcudes various setting switches and displays. A paper tape reader 16 reads out stitch data recorded on a paper tape (data directly relating to the embroidery operation such as X, Y data designating position of an embroidery frame for each stitch and function data designating operations of the embroidering machine including color changing, stopping of the main shaft of the machine and jump). A paper tape 17 on which stitch data for realizing a desired embroidery design is recorded is set in this paper tape reader 16. The stitch data read from this paper tape 17 through the paper tape reader 16 is transmitted to the data RAM 14 and stored therein.

An X-axis pulse motor 18 moves an embroidery frame 20 in the X-axis direction. A Y-axis pulse motor 19 moves the embroidery frame 20 in the Y-axis direction. To these pulse motors 18 and 19 are applied drive signals through a pulse motor driver 21.

A main shaft motor 22 drives a main shaft 23 of this automatic embroidering machine to be rotated. As is well known, a needle and a hook of the embroidering machine are driven in accordance with the rotation of the main shaft 23. A rotary encoder 24 detects the angle of rotation of the main shaft 23 (or motor 22).

Assuming that one stitching head HD is a multi-needle stitching head, this head HD comprises a plurality of needles (each needle being attached with thread of a different color). A color changing motor 25 causes, by its rotation, one of the plural needles of the head HD to be selected and driven by a needle drive mechanism in the head HD. The needle drive mechanism is adapted to move the needle vertically as the main shaft 23 is rotated. Since this needle drive mechanism is known, illustration thereof is omitted. The number of the stitching head HD is not limited to one but plural stitching heads may be provided in parallel.

A start/stop switch 26 consists of a bar switch which functions as a start switch when the bar is manipulated, e.g., in the rightward direction and function as a stop switch when the bar is manipulated, e.g., in the leftward direction. When the start switch is ON, the rotation of the main switch 23 is started and when the stop switch is ON, the rotation of the main shaft 23 is stopped.

A communication interface 27 is an external input-output interface for effecting inputting and outputting of stitch data and control data between the embroidering machine and an external device 28. The communication interface 27 consists of, e.g., an RS-232 serial interface.

The external device 28 consists of, e.g., a personal computer having a communication function or terminal device of a suitable intelligent type and is capable of setting, editing and storing of stitch data and control data corresponding to the embroidery design. The external device 28 performs inputting and outputting of stitch data and control data with the embroidering machine through a communication line.

The automatic embroidering machine further comprises other devices and equipments whose illustration is omitted. The devices constituting the control system of the automatic enbroidering machine deliver out an receive signals with the microcomputer through an interface I/F.

Figure 3:
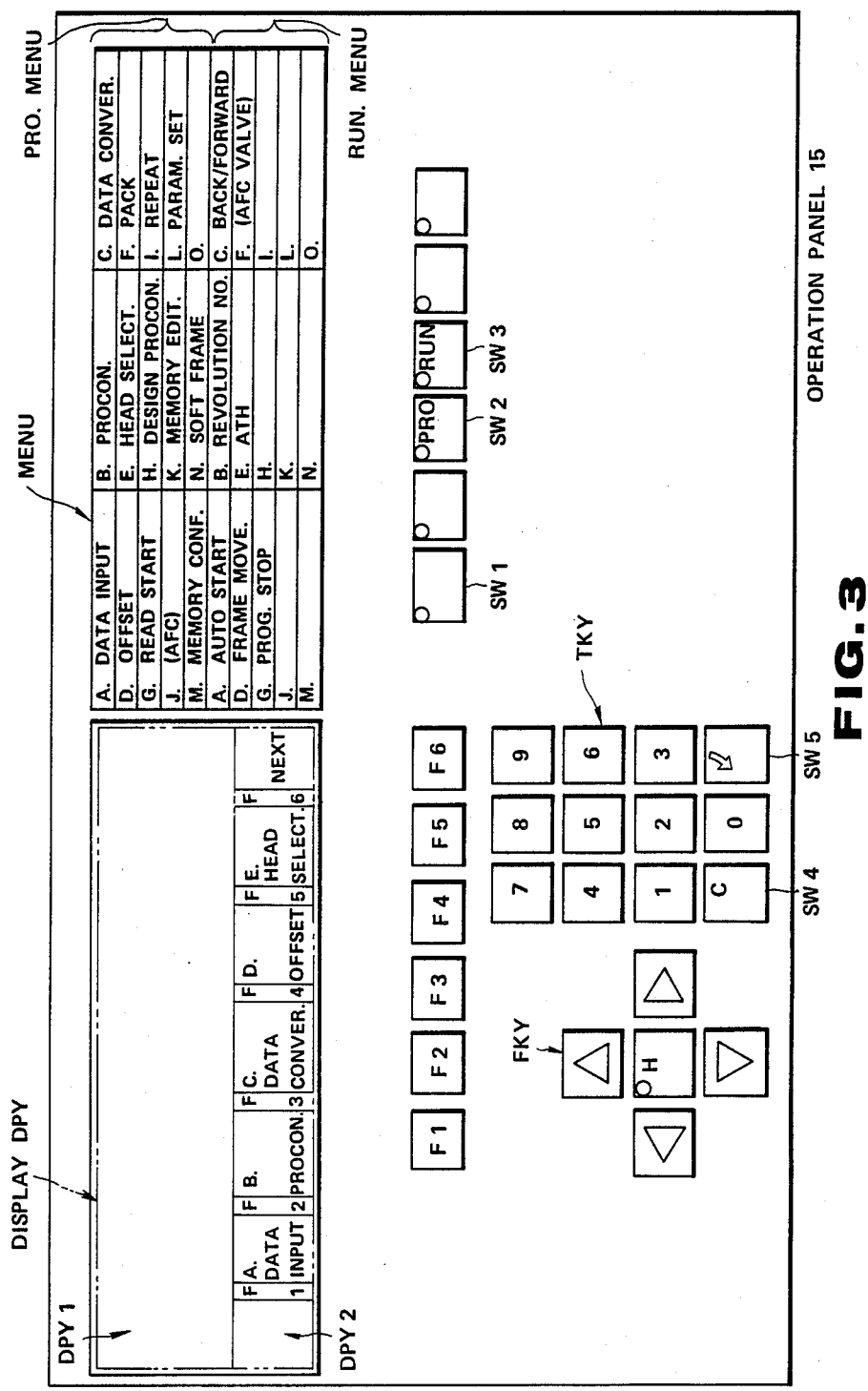
FIG. 3 is a plan view showing an example of the operation panel in FIG. 2.

An example of the switches and displays provided in the operation panel 15 is shown in FIG. 3.

A display DPY is provided for displaying data which is being set during setting of various data, displaying data which has already been set for confirmation thereof and displaying other necessary information. The display DPY is capable of displaying letters and also figures if necessary. The display DPY can be used in several display modes and, as one of such display modes, there is a display mode for setting various data or confirming contents of the set data. In this mode, as shown in FIG. 3, the display DPY functions in two sections of a set contents display section DPY1 occupying a relatively large area in the upper stage of the display DPY and a function switch explanation display section DPY2 in the lower stage. In another display mode, the display DPY functions as display means for displaying a graphic pattern of the embroidery pattern. A quartz display may for example be employed as this display DPY.

Six function switches F1-F6 are provided below the display DPY. The above described function switch explanation display section DPY2 displays explanation about the function assigned to the respective function switches F1-F6.

Depending upon the state of assignment of the functions to the functon switches F1-F6, the left side five function switches F1-F5 sometimes function as function switches corresponding to various data setting functions and the remaining switch F6 functions as a next function (NEXT) selection key. The function switch explanation display section DPY2 consists of six frames corresponding to the function switches F1-F6 and in each of the display frames corresponding to the function switches F1-F6 appears a display explaining the function which is currently assigned to the function switch (e.g., this display consists of letters "DATA INPUT" or "PROCON"). In this case, if the function switch F6 is functioning as the next function selection key, a display "NEXT" explaining the next function selection key function appears. Depending upon the state of assignment of other functions to the function switches F1-F6, the function switch F6 may function as a key for setting or selecting some other data.

When the function switch F6 functions as the next function (NEXT) selection key, the operation of the function switch F6 switches the setting and selection functions to be assigned to the respective function switches. Upon this switching, contents of display in the function switch explanation section DPY are switched.

A function switch menu section MENU disposed on the right side of the display DPY is a list in which displays of all functions assignable to the function switches F1-F6 are visibly and fixedly displayed. This function menu section MENU consists of a program mode menu PRO. MENU and running mode menu RUN. MENU. The program mode menu PRO.MENU displays all functions assignable to the function switches F1-F6 during the program mode. The running mode menu RUN.MENU displays all functions assignable to the function switches F1-F6 during the running mode.

The program mode is a mode in which setting of various data relating to the embroidery program for realizing a desired embroidery design (e.g., inputting of data corresponding to the desired embroidery design, i.e., "DATA INPUT" or setting of the order of changing thread color, i.e., "PROCON") is performed. The running mode is a mode in which setting of running conditions (e.g., the revolution number of the main shaft of the machine) before start of operation of the embroidering machine.

A display changeover switch SW1 is provided for switching the display mode of the display DPY. This display changeover switch SW1 is used, for example, when, as illustrated, the display mode is switched from the display mode in which the display DPY is used in the two sections of the setting contents display section DPY1 and the function switch explanation display section DPY2 to another display mode.

A program mode switch SW2 is a switch operated when the operation mode of this embroidering machine is set to the above described program mode.

A running mode switch SW3 is a switch operated when the operation mode of this embroidering machine is set to the above described running mode.

A frame moving key switch FKY is a switch operated when the embroidery frame 20 is moved by a manual opertion. A ten key switch TKY is a switch operated when various numerical data are to be inputted. A setting confirmation switch SW4 is a switch operated when contents of set data are to be confirmed in various data setting operations. A set switch SW5 is a switch operated when numerical data inputted by the ten key switch TKY is to be registered or upon ocmpletion of setting of a function and functioning as a return key.

Nextly, operations concerning the present invention among the operations executed by the automatic embroidering machine of FIG. 2 under the control of the microcomputer will be described with reference to flow charts of FIG. 5 and subsequent figures.

Figure 5:
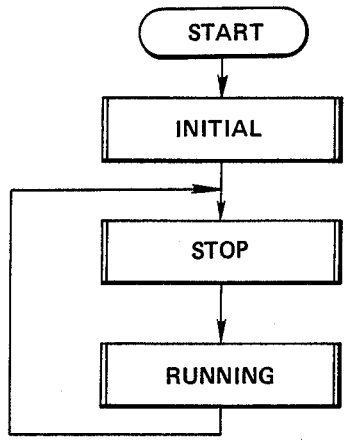
FIG. 5 is a flow chart showing a main routine of a program executed by a microcomputer in FIG. 2.

Upon turning on of the automatic embroidering machine, as shown in FIG. 5, the processing proceeds to embroidering machine main shaft stop routine through a predetermined initial routine. Processing operations concerning the portion relating to the present invention and processing operations for setting various data are executed in this main shaft stop routine. When the machine is not run, this main shaft stop routine is always carried out. When the start switch has been turned ON by operating the start/stop switch 26, the processing proceeds to running routine. In the running routine, the main shaft 23 is driven and rotated and stitch data for each one stitch is sequentially read out from the stitch data memory area in the data RAM 14 in synchronism with one rotation of the main shaft and the stitching operation is carried out in accordance with the read out data.

An example of the main shaft stop routine will be described with reference to FIGS. 6a and 6b. In stop initial routine, a predetermined initializing processing during stop of the machine is executed. In next step 30, whether or not the operation mode is the running mode or the program mode is examined in accordance with the contents of an operation mode flag. The operation mode becomes the program mode by turning on of the program mode switch SW2 and the running mode by turning on of the running mode switch SW3.

If the operation mode is the program mode, the processing proceeds to step 31. In step 31, initial contents of display in the program mode as shown in FIG. 4a are displayed by the display DPY. In this case, the function switch explanation display section DPY2 displays explanation of the modes A through E.

In next step 32, whether or not the function switches F1-F5 are turned on is judged.

If any of the function switches F1-F5 has been turned on, the processing proceeds to step 33 in which data setting processing concerning a function corresponding to one function switch which has been turned on among functions corresponding to items "A-E" in the program mode is performed and thereafter the processing returns to step 31. If result of step 32 is NO, the processing proceeds to step 34 in which whether or not the function switch F6 for selecting a next function is ON is examined. If result is NO, whether or not the running mode switch SW3 has been turned on is examined in step 35. If result is NO, the processing returns to step 32 and the above processing is repeated.

Upon selecting a next function by depressing the function switch F6, the function switch explanation display section DPY2 displays functions corresponding to items F-J in the program mode as shown in FIG. 4b (step 36).

In step 37, whether or not the function switches F1-F5 have been turned on is judged. If result is YES, the processing proceeds to step 38 in which data setting processing concerning a function corresponding to one function switch which has been turned on among functions corresponding to items "F-J" in the program mode is performed and the processing returns to step 36. If result in step 37 is NO, the processing proceeds to step 39 in which whether or not the function switch F6 for selecting a next function is ON is examined.

If the function switch F6 is ON, the function switch explanation display DPY2 displays explanation of functions corresponding to items "K, L" in the program mode as shown in FIG. 4c (step 40). If the function switch F6 is not ON, whether or not the running mode switch SW3 has been turned on or not is examined in step 41. If the result is NO, the processing returns to step 37 in which the processing of the program mode is repeated.

In step 42, whether or not the function switches F1 and F2 have been turned on is judged. If the result is YES, the processing proceeds to step 43 in which data setting processing concerning a function corresponding to one function switch which has been turned on among functions corresponding to items "K, L" in the program mode is performed and the processing thereafter returns to step 40. If the result is NO, the processing proceeds to step 44 in which whether or not the function switch F6 for selecting a next function is ON is examined.

If the function switch F6 is ON, the processing returns to step 31 (FIG. 6a) in which the processing of the program mode is repeated. If result is NO, whether or not the running mode switch SW3 has been turned on is examined in step 45. If result is NO, the processing returns to step 42.

If the running mode switch SW3 has been turned on, either one of steps 35, 41 and 45 is judged YES and the operation mode is switched from the program mode to the running mode. During a period of time immediately after switching to the running mode, an initial processing in the running mode is performed (step 46).

In step 47, setting of various data in the running mode is executed. In the running mode, the function switch explanation display section DPY2 displays the modes A-E in the running mode (see the running mode menu RUN. MENU in FIG. 3). If a next function is selected by depresing the function switch F6, the function switch explanation display section DPY2 displays explanation of F and G modes in the running mode. The function switch explanation section DPY2 is set to a state in which a desired mode can be displayed and the desired mode is selected by operating one of the function switches F1-F5. Desired data is set by oprating the ten keys TKY or the like means. If, for example, the revolution number of the embroidering machine is to be set, "revolution number mode" of the mode B is selected and a desired revolution number is set and inputted by the ten key switch TKY. In this manner, necessary conditions for running the embroidering machine are established in step 47 by utilizing the multi-functional mode selection function of the function switches F1-F6.

In step 48, whether or not the start switch has been turned ON by the start-stop switch 36 is examined. If the start switch is ON, the processing returns to the main routine and enters the running routine (FIG. 5). If the start switch is not ON, the processing proceeds to step 49, in which whether or not the program mode switch SW2 is ON is examined. If result is NO, the processing returns to step 47 in which routine for setting various data in the running mode is repeated. If the progrm mode switch SW2 is ON, the operation mode is switched from the running mode to the program mode and the processing proceeds to step 31 (FIG. 6a) in which the routine for setting various data in the program mode is repeated.

An example of data setting processing routine 33, 38, 43 will now be described with reference to FIG. 7.

Figure 6A:
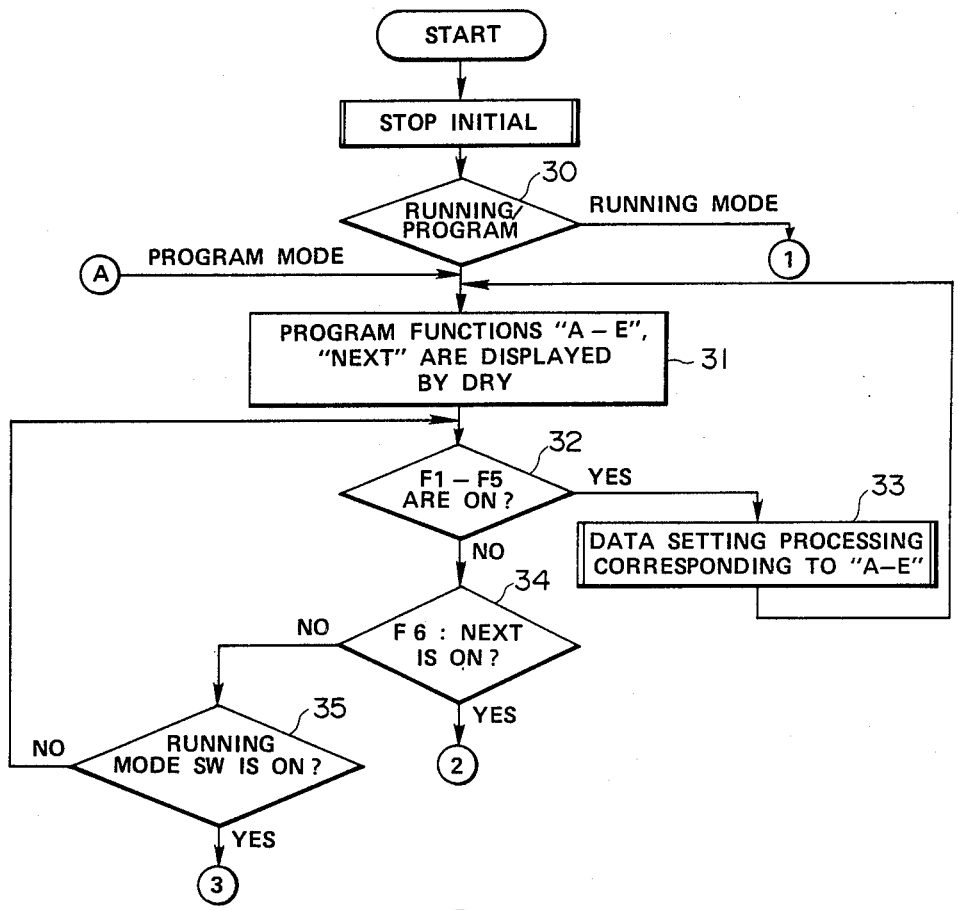
FIGS. 6a and 6b are flow charts showing an example of an embroidering machine main shaft stop routine in the main routine shown in FIG. 5.
Figure 7:
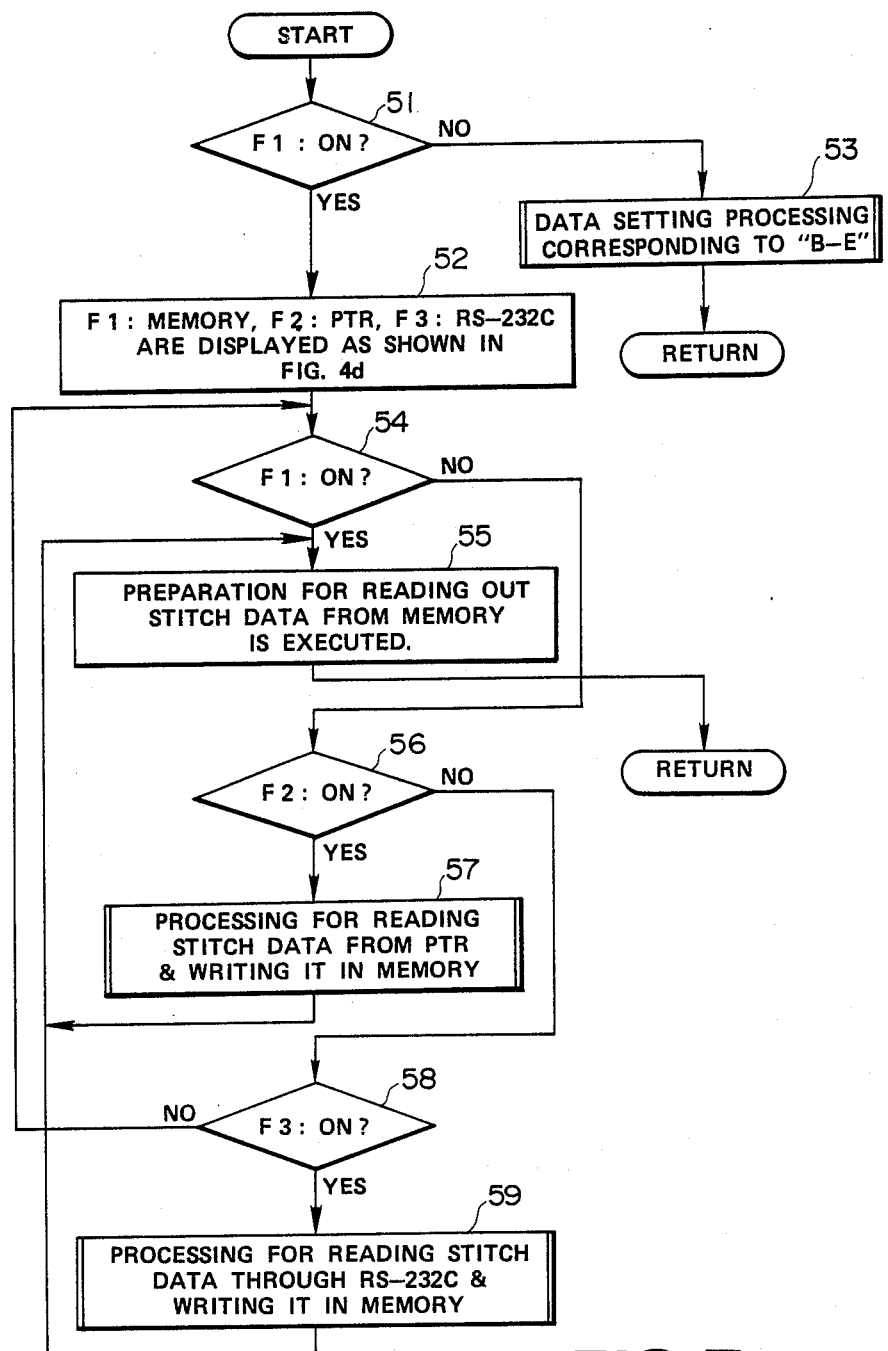
FIG. 7 is a flow chart showing an example of data input setting prosecution routine in the program mode.

FIG. 7 shows an example of "data input" setting processing routine executed in step 33 in a case where "data input" mode has been selected by depressing the function switch F1 which has been set to a function shown in FIG. 4a in the display DPY by the processing in step 31 (FIG. 6a). In actual selection and setting of a function, a desired function is selected by first selecting the above described function menu. Upon selection of the desired function, the screen of the display DPY is automatically switched to sub-display corresponding to the selected function so that data setting can be made in the selected function.

In step 51, whether or not the function switch 1 is ON, i.e., whether or not the processing is the data input setting processing, is examined. If result is NO, the processing proceeds to step 53 in which data setting processing routine corresponding to other items "B-E" in the program mode is executed. If result is YES, the processing proceeds to step 52.

In step 52, the contents of the display in the function switch explanation display section DPY2 are automatically switched to sub-display in the data input setting mode as shown in FIG. 4d. As in this case, in the switching to the sub-display, the function assignment to the respective function switches is automatically switched without particular switch operation. In other words, the processing program is prepared so that the function assignment to the function switches is automatically switched by progress from step 51 to step 52.

"Data input setting mode" is a mode for setting from where stitch data for a desired embroidery design should be taken or read out. In this case, there are three items in this example, namely (1) to read out the desired stitch data from the data RAM, (2) to pick up the desired data from the paper tape and register it in the data RAM 14 and (3) to pick up the desired stitch data from an external device such as a personal computer through the communication interface 27 and register it in the data RAM 14. The function switch F1 selects the function corresponding to the first item and, in correspondence to this, a "memory" is displayed in the display DPY. The function switch F2 selects the function corresponding to the second item and, in correspondence to this, "PTR" is displayed in the display DPY. The function switch F3 selects the function corresponding to the third item and, in correspondence to this, "RS-232C" is displayed in the display DPY.

In next step 54, whether or not the function switch F1 is ON, i.e., whether or not it is the mode for reading out the desired stitch data from the data RAM 14, is examined. If the function switch F1 is ON, the processing proceeds to step 55 in which a predetermined preparation processing for reading out the desired stitch data from the data RAM 14 is executed and then the processing returns to the main routine. If result is NO, the processing proceeds to step 56 in which whether or not the function switch F2 is ON, i.e., whether or not the desired stitch data should be picked up from the paper tape 17, is judged.

If the function switch F2 is ON in step 56, the processing proceeds to step 57 in which a processing for picking up the desired stitch data from the paper tape 17 and storing it in the data RAM 14 is performed. Then, the processing returns to step 55 in which a preparation processing for reading out the desired stitch data from the data RAM 14 is made and the processing returns to the main routine. If step 56 is NO, the processing proceeds to step 58 in which whether or not the function switch F3 if ON, i.e., whether or not the desired stitch data should be picked up from an external device such as a personal computer through the communication interface 27 and registered in the data RAM 14, is examined.

If the function switch F3 is ON, the processing proceeds to step 59 in which the stitch data of the embroidery design given from the external device such as the personal computer through the communication interface 27 is stored in the date RAM 14. Then, the processing returns to step 55 in which a preparation processing for reading out the desired stitch data from the data RAM 14 is performed and then returns to the main routine. If step 58 is NO, the processing returns to step 54 in which the above processing is repeated.

The function switch is not limited to a mechanical contact type switch but may be any switch including a non-contact type switch.

The function switch may also be a transparent switch disposed on the corresponding screen of the display DPY2.

In the above described embodiment, the function assignment means for assigning a function to each of the function switches F1-F6 is incorporated in the processing steps in the software program (e.g., steps 31, 36, 40 etc.). However, the function assignment means is not limited to this. For example, memory means such as a function assignment table may be prepared and functions may be assigned by accessing this memory means.

This display means for displaying data is not limited to the quartz display but other devices such as a CRT display, LED display and plasma display may also be employed.

Figure 8:
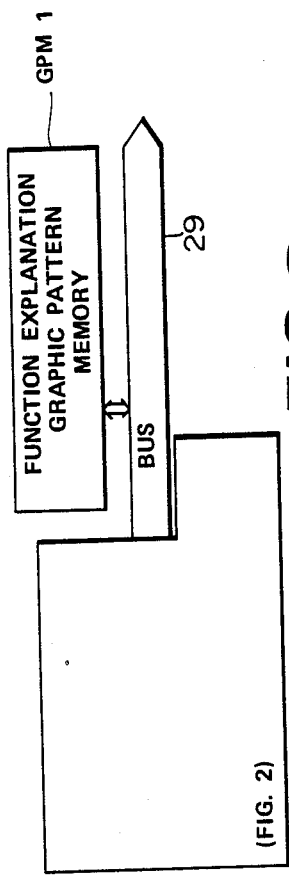
FIG. 8 is a block diagram of a hardware structure schematically showing a control system of another embodiment of an embroidering machine incorporating the data setting device according to the invention.

Another embodiment of a data setting device in an automatic emboridering machine will now be described. In this embodiment, explanation of functions assigned to respective function switches F1-F6 is made by graphic display in the function switch explanation display section DPY2. For this purpose, firstly, a function explanation graphic pattern memory GPM1 as shown in FIG. 8 is additionally provided in the hardware structure of FIG. 2. This function explanation graphic pattern memory GPM1 stores, with respect to various functions which are assignable to the respective function switches F1-F6, pattern data of figures symbolizing explanation of the respective functions. The memory GPM1 may be constructed of either A RAM or a ROM. Address input and data input and output are connected to the CPU 11 (FIG. 2) through a bus 29.

Figure 9:
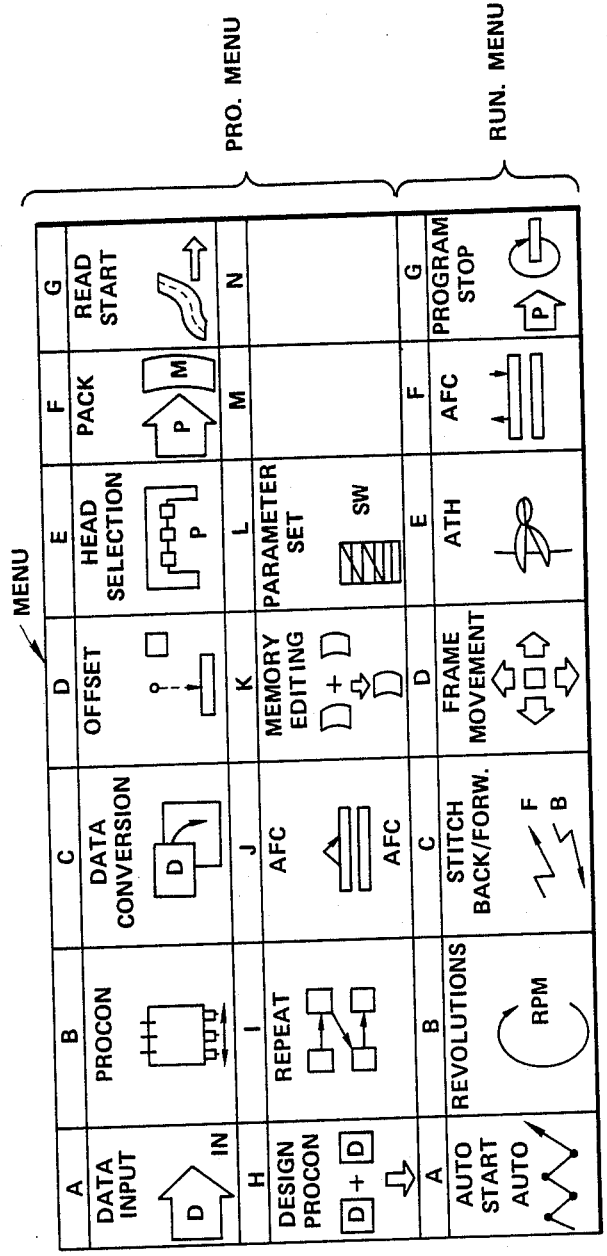
FIG. 9 is a plan view showing an example of a fixed menu display in the operation panel in the embodiment of FIG. 8.

In this embodiment, the function switch explanation display section DPY2 displays symbols explaining functions which are currently assigned to the respective function switches F1-F6. In this embodiment, the fixed display in the function menu section MENU (FIG. 3) in the operation panel 15 is altered as shown in FIG. 9. In this function menu section MENU, symbols and characters explaining the respective functions are displayed together. In the display section DPY2, only symbols are displayed but the operator can readily understand the meaning of each symbol by referring to the list in the menu section MENU. It should be noted that such menu section MENU is not indispensable.

Figure 6B:
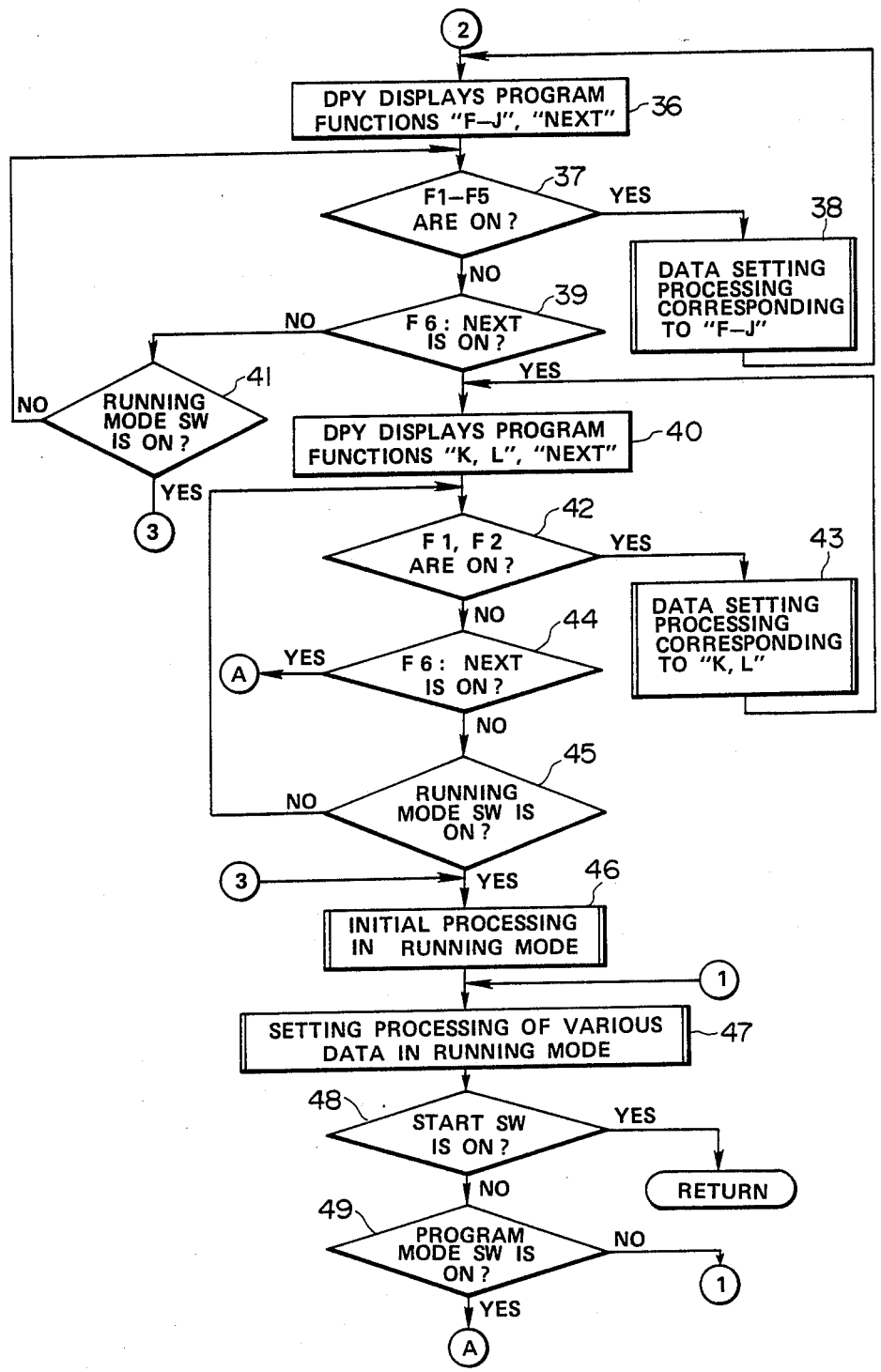

As an example of the software program in this embodiment, the above described example of FIGS. 6a and 6b and FIG. 7 can be applied without much modification. However, in the step for displaying functions of the function, switches F1-F6 in the display section DPY2, graphic pattern data explaining the functions assigned to the respective function switches F1-F6 are read from the function explanation graphic pattern memory GPM1 and, in accordance with these graphic pattern data, figures symbolizing these functions are displayed in the display section DPY2.

In a case where functions of the modes A-E in the program mode are to be assigned to the function switches F1-F6, the display section DPY2 displays symbols of the respective functions as shown in FIG. 10a. In a case where functions of the modes F-J in the program mode are to be assigned to the function switches F1-F6, the display section DPY2 displays symbols as shown in FIG. 10b. In a case where functions of the modes K-O in the program mode are to be assigned, the display section DPY2 displays symbols as shown in FIG. 10c. Further, in a case where functions of the modes A-E in the running mode are to be assigned to the function switches F1-F6, the display section DPY2 displays symbols as shown in FIG. 10d and, in a case where functions of the modes F-J in the running mode are to be assigned, the display section DPY2 displays symbols as shown in FIG. 10e.

Figure 10:
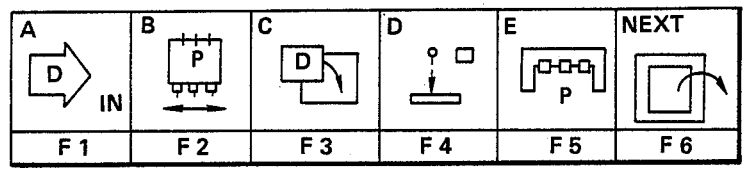
FIGS. 10a through 10e are diagrams showing specific examples of function display in the display of the embodiment of FIG. 8 corresponding to the respective function switches.
Figure 10:
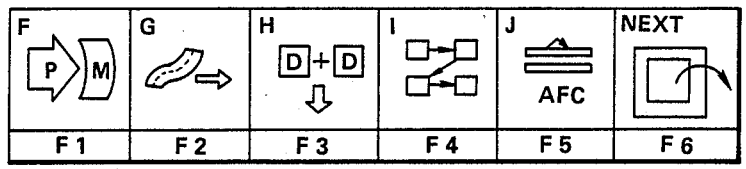
Figure 10:
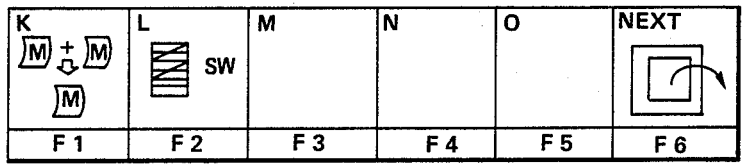
Figure 10:
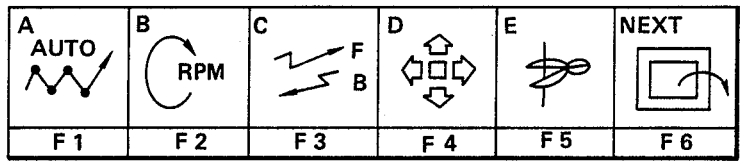
Figure 10:
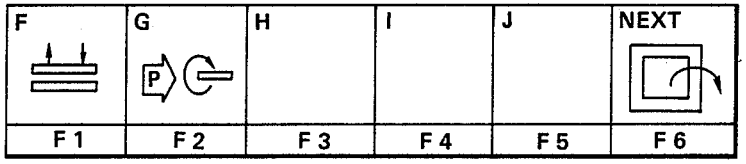

Symbols for explaining function of the function switches are not limited to those shown in FIGS. 9 and 10 but may be suitably changed.

Anothger embodiment of a data setting device in an emboidering machine will now be described. In this embodiment, the switch in the opertion panel is composed of a transparent switch disposed on the front surface of the screen of the display.

Figure 11:
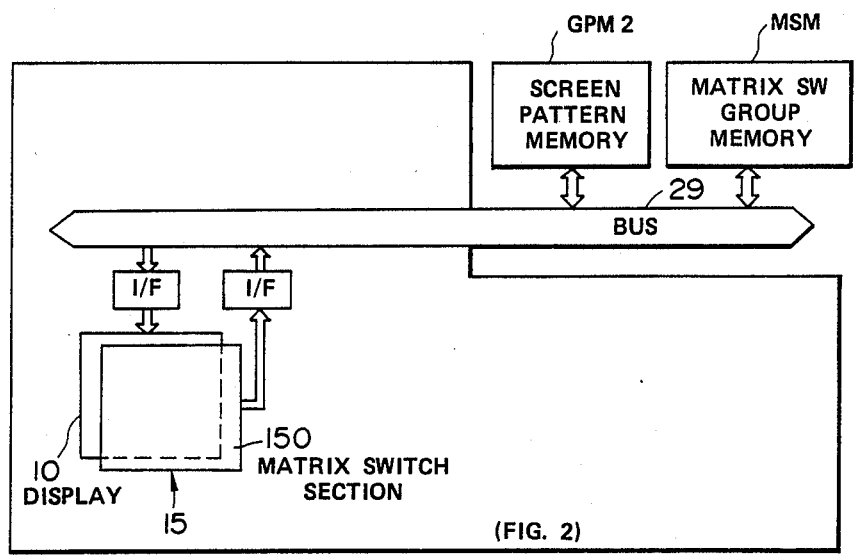
FIG. 11 is a block diagram of a hardware structure schematically showing a control system of still another embodiment of the embroidering machine incorporating the data setting device according to the invention.

In this embodiment, the hardware structure of FIG. 2 is modified to that of FIG. 11. In this structure, a screen pattern memory GPM2 and a matrix switch group memory MSM are additionally provided and reading of these memories is controlled by control in the CPU 11 (FIG. 2) through a bus 29. The operation panel 15 is composed of a display 10 and a matrix switch section 150.

The display 10 is provided for displaying characters and pictures. As the display 10, a CRT display may be used but othe rdisplays such as a quartz display, LED display and plasma display may also be used. The matrix switch section 150 is a matrix switch in the form of a tranparent sheet consisting of plural switch elements disposed on the front surface of the display 10.

In the display 10, one or more switch patterns are displayed in accordance with a previously programmed proper switch pattern arrangement pattern and also characters of figures for explaining functions of the switch patterns as switches are displayed. Since the matrix switch section 150 disposed on the front surface of the display 10 is made of a tranparent sheet, the display on the screen of the display 10 can be seen through the matrix switch section 150. This matrix switch section 150 functions as input means for designating and inputting a desired switch pattern displayed by the display 10.

The switch elements in the matrix switch section 150 are combined into groups in correspondence to the respective switch pattern display positions. When a predetermined number (e.g., 1) or more of the switch elements in each switch element group has been turned on, this is assumed to be turning on of a switch relating to the switch pattern corresponding to the switch element group. Accordingly, the operator watches the respective switch pattern displays on the screen of the display 10 and depresses a position of a switch pattern corresponding to a desired switch function through the transparent matrix switch section 150. A switch element in the switch element group corresponding to the switch pattern thereby is turned on and this is treated as turning on of the switch corresponding to the switch pattern.

By way of example, a switch pattern arrangement pattern displayed by the display 10 is prestored in the screen pattern memory GPM2. The screen pattern memory GPM2 prestores plural switch pattern arrangement patterns and one of the switch pattern arrangement patterns is selectively read from this screen pattern memory GPM2 and each switch pattern in the switch pattern arrangement pattern is displayed by the display 10 by processing in the microcomputer. In other words, one switch pattern arrangement pattern corresponds to one screen in the display 10.

A matrix switch group memory MSM stores, with respect to each of the plural switch pattern arrangement patterns, data representing the switch element groups in the matrix switch section 150 arranged in correspondence to the display positions of the respective switch patterns in the switch pattern arrangement pattern.

Figure 12:
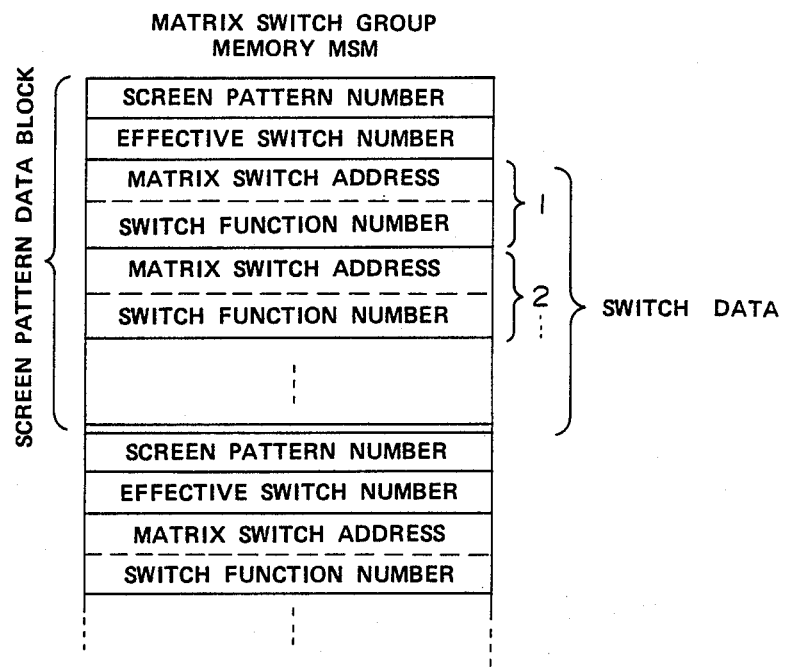
FIG. 12 is a diagram showing an example of memory structure of a matrix switching group memory in FIG. 11.

An example of memory map in this matrix switch group memory MSM is shown in FIG. 12. The memory map consists of plural screen pattern data blocks. One screen pattern data block corresponds to one switch pattern arrangement pattern. These screen pattern data blocks store "screen pattern number data", "effective switch number data" and "switch data". "Screen pattern number data" is number data discriminating one screen pattern (switch pattern arrangement pattern) from another.

"Effective switch number data" is data representing the number of switch patterns displayed in the screen pattern.

"Switch data" consists of "matrix switch address data" and "switch function number data" for each switch pattern.

"Matrix switch address data" is data representing a switch element group in the matrix switch section 150 disposed at postion corresponding to display position of the switch pattern. Since each switch element in the matrix switch section 150 is disposed on the matrix, each switch element can be identified by a predetermined address assigned to the switch. This address is hereinafter referred to as "matrix switch address". "Matrix switch address data", i.e., "data representing a group of switch elements", means aggregation of matrix switch addresses of all switch elements disposed at position corresponding to the particular switch pattern. If, for example, the display postion of the switch pattern corresponds to switch elements of matrix switch addresses 3, 4 and 5 of the matrix switch section 150, 3, 4, 5 is stored as "matrix switch address data". "Switch function number data" is number data for discriminating one switch function assigned to the switch pattern from another.

In accordance with depression of a desired switch pattern on the screen pattern of the display through the transparent matrix switch section 150, this "switch function number data" corresponding to the depressed switch pattern is finally read out. If, for example, a switch pattern whose "matrix switch address data" is "3, 4, 5" and "switch function number data" is "10" is depressed, at least one of the switch elements at the matrix address 3, 4, 5 in the matrix switch section 15 produces an ON output and, as a result of collation of this output of the matrix switch section 150 with contents of storage relating to this screen pattern in the matrix switch group memory MSM by processing in the microcomputer, "switch function number data" which is "10" corresponding to "matrix switch address data" whose contents are "3, 4, 5" is read out and a processing is 481 to the switch function number data "10" has been made.

Figure 13A:
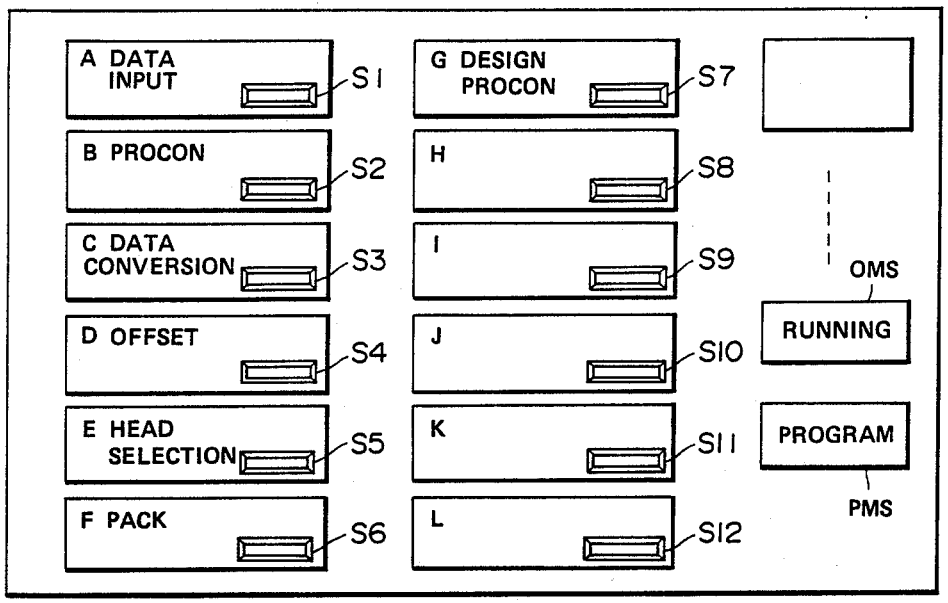
FIGS. 13a through 13c are diagrams showing examples of displayed screen patterns in the display of the embodiment of FIG. 11.
Figure 13B:
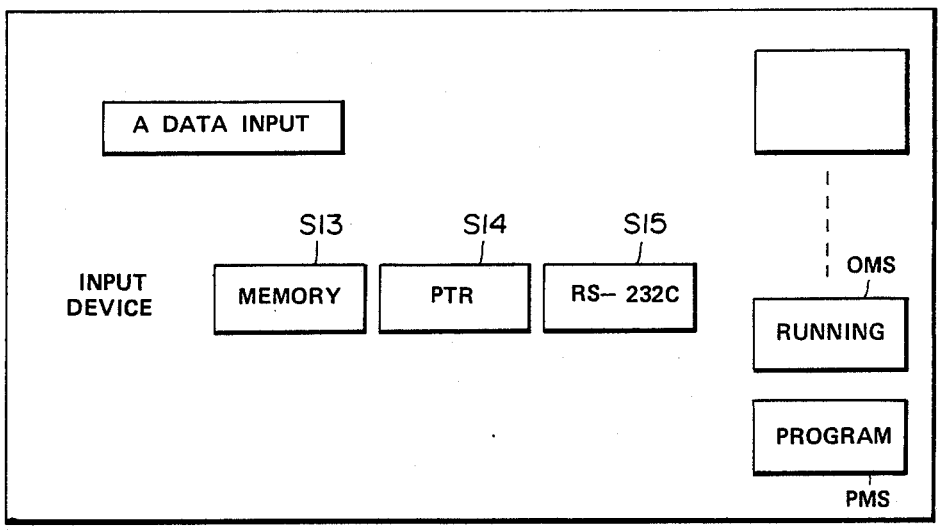
Figure 13C:
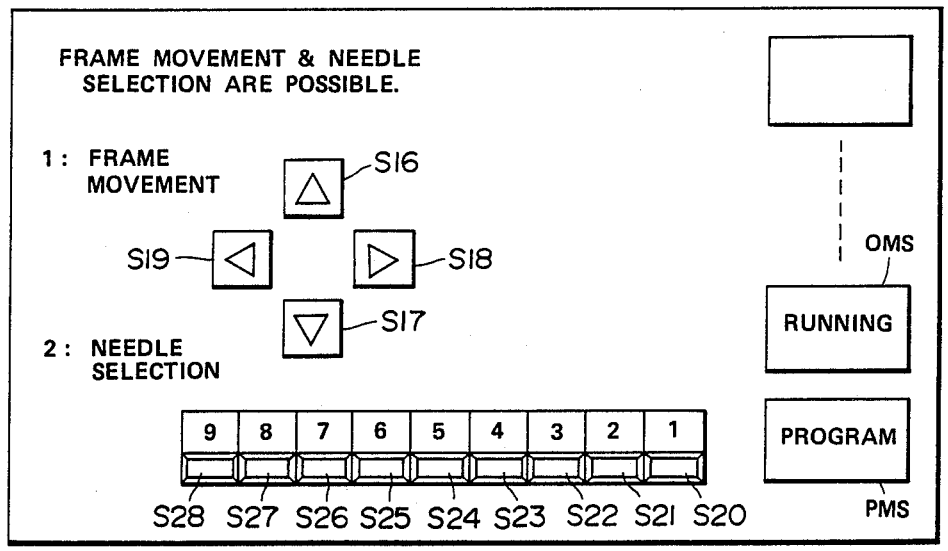

Examples of screen patterns in the display 10 are shown in FIGS. 13a through 13c.

FIG. 13a shows an example of a program menu screen pattern. In this case, switch patterns S1-S12 arranged in two rows in the middle and left of the screen pattern are function selection switches in the program mode. The switch patterns on the right side of the screen pattern are mode selection switches, OMS is a running mode switch, and PMS is a program mode switch. By operation of the program mode switch PMS, or automatically in accordance with processing step of the microcomputer, the orperation mode becomes the program mode and the screen pattern of the display 10 is switched to the program menu screen pattern as shown in FIG. 13a. The switch patterns S1-S12 correspond to data setting functions in the program mode.

By operation of the running mode switch OMS, or automatically in acordance with processing step of the microcomputer, the operation mode becomes the program mode and the screen pattern of the display 10 is switched to an unillustrated screen pattern of running menu in which switch patterns for setting various running conditions are displayed.

For enabling switching to a desired mode any time, in the present embodiment, the mode selection switch disposed on the right side of the screen pattern in the display 10 is always displayed in all screen patterns.

Nextly, an example of the embroidering machine main shaft stop routine executed by the embroidering machine of FIG. 11 under the control of the microcomputer will be described with reference to FIGS. 14a and 14b. In stop initial routine, a predetermined initial processing during stoppage of the embroidering machine is executed. In next step 60, whether or not the operation mode is the running mode or the program mode is examined in accordance with contents of an operation mode flag.

If the operation mode is the program mode, the processing proceeds to step 61. In step 61, initial contents of display in the program mode as shown in FIG. 13a, i.e., program menu screen pattern, is displayed in the display 10.

In next step 62, matrix switch input processing subroutine is executed.

In the matrix switch input processing subroutine, outputs of the respective switches in the matrix switch section 150 are scanned to examine whether or not the matrix switch corresponding to each switch pattern in the current screen pattern of the display 10 has been turned on. An example of this is shown in FIG. 15.

Figure 15:
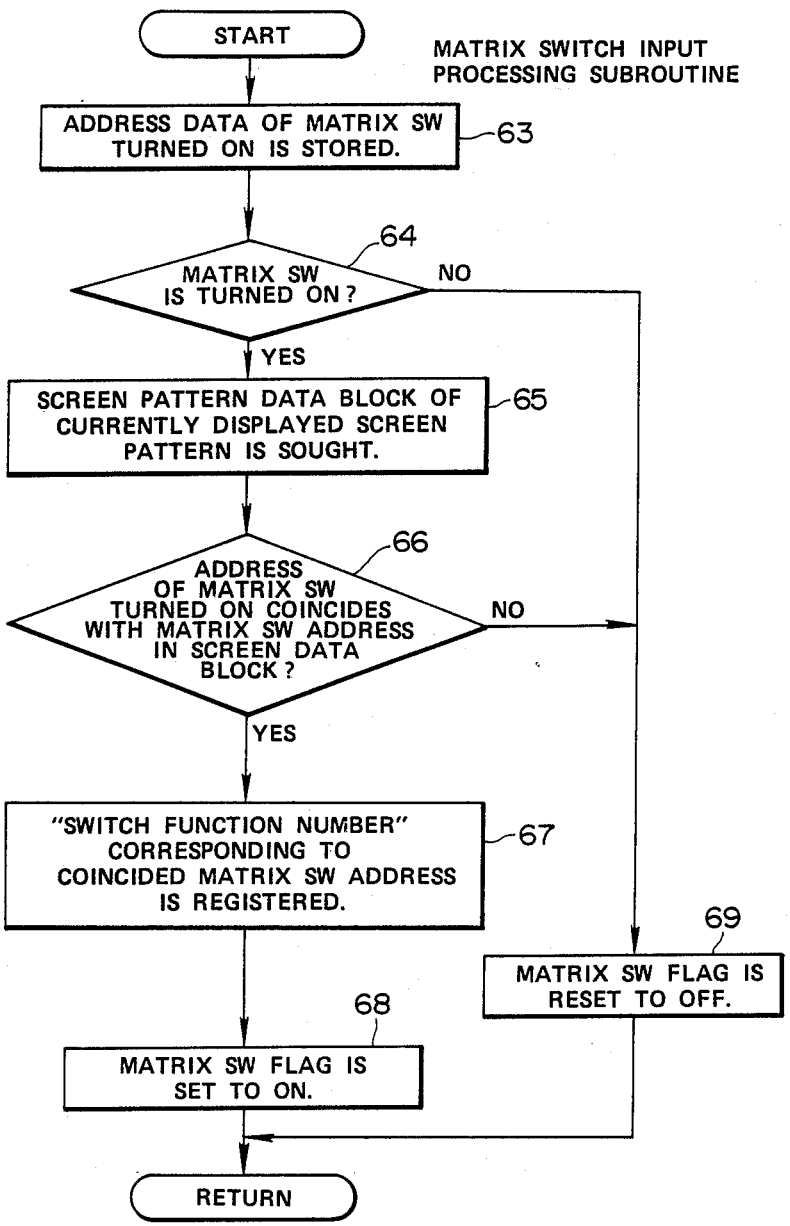
FIG. 15 is a flow chart showing an example of matrix switch input processing routine in the program mode in the embodiment of FIG. 11.

Referring to FIG. 15, in step 63, outputs of the respective switches in the matrix switch section 150 are scanned and the address data of a matrix switch which has been found to be ON is stored. In next step 64, whether or not any matrix switch has been turned on is confirmed. If result is YES, the processing proceeds to step 65 in which screen pattern data block corresponidng to the screen pattern number on the currently displayed screen pattern in the display 10 is sought in the matrix switch group MSM. In next step 66, "switch address data" doe each switch pattern in the screen pattern data block in the matrix switch group memory MSM is compared with the address data of the matrix switch which has been turned on and stored in the preceding step 63 to examine whether or not there is coincidence. If there is coincidence, the processing proceeds to step 67 in which "switch function number" stored in the screen data block of the matrix switch group memory MSM corresponding to "switch address data" which coincides with the address data of the matrix switch which has been turned on is registered as data representing the switch pattern which has been turned on. Thus, which switch pattern among the switch patterns currently displayed on the screen pattern in the display 10 has been turned on is detected.

In next step 68, the matrix switch flag is set to the switch-on state and the processing returns to the main routine.

If no switch has been depressed in the matrix switch section 150 (when step 64 is NO), or if no matrix switch corresponding to the switch patterns currently displayed in the screen pattern of the display 10 has been depressed (when step 66 is NO), the matrix switch flag is reset to the switch-off state in step 69 and the processing returns to the main routine.

In this embodiment, the mode selection switches (OMS, PMS etc.) which are always displayed on the right side of the screen pattern of the display 10 are not subject to the matrix switch input subroutine of FIG. 15. Alternatively, these mode selection switches (OMS, PMS etc.) may be processed by the matrix switch input processing subroutine of FIG. 15.

Figure 14A:
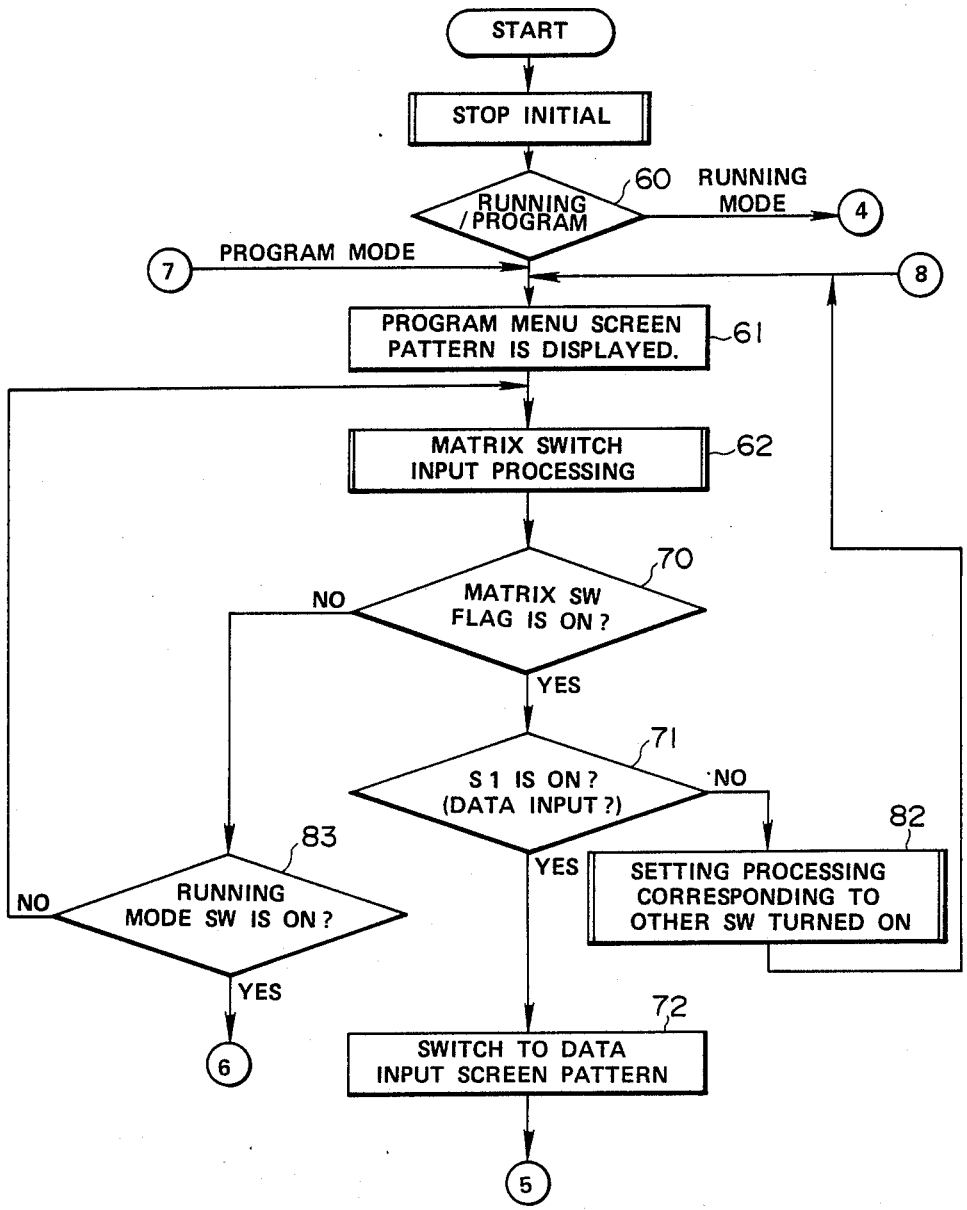
FIGS. 14a and 14b are flow charts showing an example of embroidering machine main shaft stop routine in the embodiment of FIG. 11.
Figure 14:
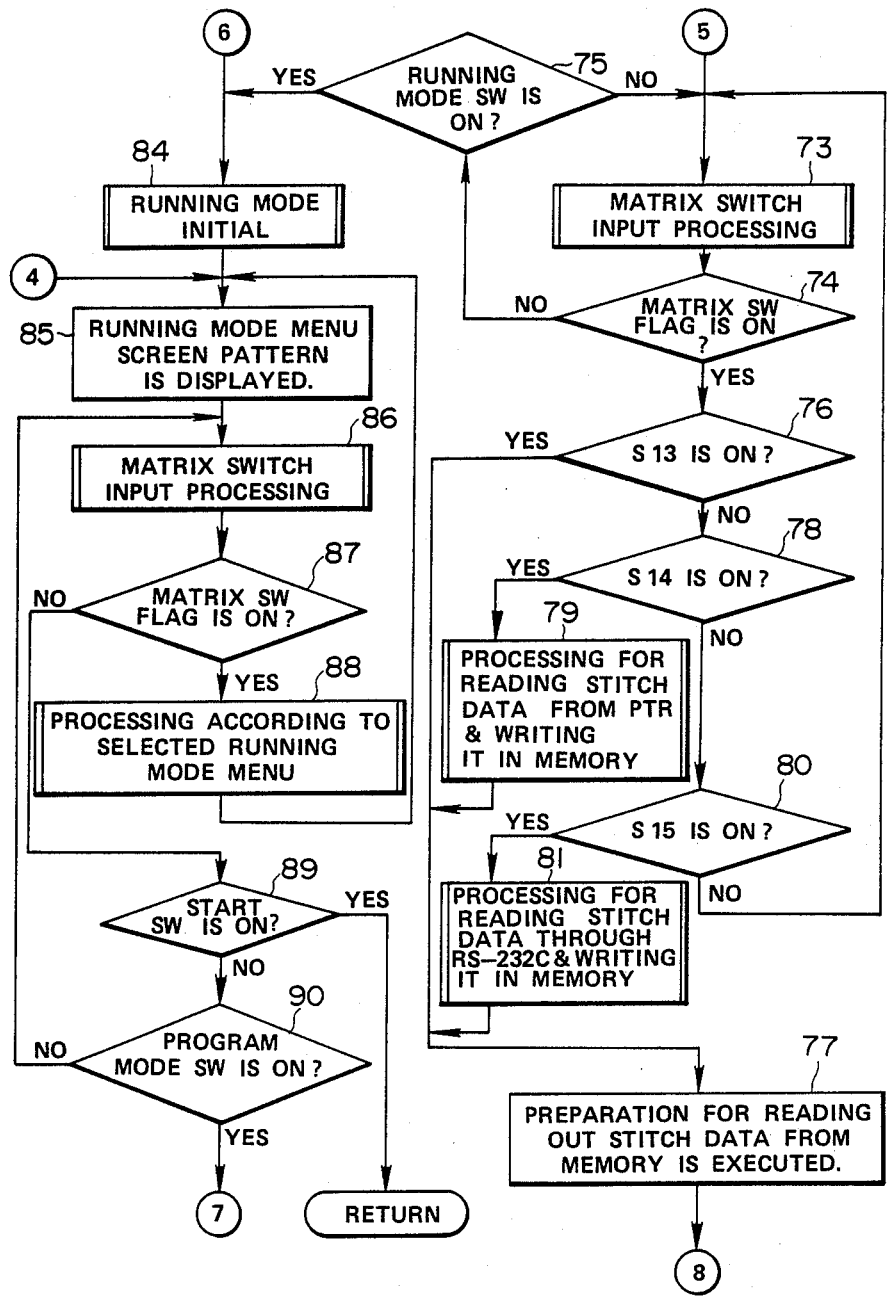

Reverting to FIG. 14a, in step 7, whether or not the above matrix switch graph is set to the switch-on state is examined. If result is YES, a predetermined processing corresponding to the switch pattern which is ON is executed by processings of step 71 and subsequent steps.

If none of the menu switch patterns S1-S12 is ON, the processing proceeds from NO of step 70 to step 83 in which whether or not the running mode switch OMS has been turned on is examined. If result is NO, the processing returns to the matrix switch input processing subroutine of step 62.

In step 71, whether or not the switch pattern S1 has been turned on is examined. This can be found by "switch function number" registered in step 67 in FIG. 15. To the switch pattern S1 is assigned a function for selecting the "data input" mode. If result in step 71 is YES, the processing proceeds to step 72 in which contents of display by the display 10 are switched to the screen pattern for the "data input" mode. An example of the screen pattern for "data input" is shown in FIG. 13b.

The "data input" mode is, as described above, a mode for setting where stitch data for a desired embroidery design should be picked up or read out. There are three items in the "data input" mode in this embodiment. The switch pattern S13 is one for selecting a function corresponding to the first item. The characters for "memory" are displayed for this item. The switch pattern S14 is one for selecting a function corresponding to the second item. The characters "PTR" are displayed for this item. The switch pattern S15 is one for selecting a function correponding to the third item. The characters "RS-232C" are displayed for this item.

In next step 73, the matrix switch input processing subroutine shown in FIG. 15 is executed to examine whether or not any of the switch patterns S1-S15 has been turned on.

If any of the switch patterns S13-S15 has been turned on, the matrix switch flag is set to the on-state as described above. In step 74, whether or not the matrix switch flag has been set to the on-state is examined. If result is YES, the processing proceeds to step 76. If the result is NO, the processing proceeds to step 75 in which whether or not the running mode switch OMS has been turned on is examined. If result is NO, the processing returns to the matrix switch input subroutine of step 73.

In step 76, whether or not the switch pattern S13 has been turned on, i.e., whether the operation mode is one for reading out desired stitch data from the data memory 14, is examined. If the switch pattern S13 has been turned on, the processing proceeds to step 77 in which a predetermined preparation processing for reading out the desired stitch data from the data memory 14 is executed. Then, the processing returns to step 61 (FIG. 14a).

If step 76 is NO, the processing proceeds to step 78 in which whether or not the switch pattern S14 has been turned on, i.e., whether or not the desired stitch data should be picked up from the paper tape 17, is judged. If the switch pattern S14 has been turned on, the processing proceeds to step 79 in which the desired stitch data is picked up from the paper tape 17 and stored in the data memory 14. Then, the processing returns to step 77 for executing a preparation processing for reading out desired stitch data from the data memory 14 and thereafter returns to step 61.

If step 78 is NO, the processing proceeds to step 80 in which whether or not the switch pattern S15 has been turned on, i.e., whether or not the desired stitch data has been picked up from the external device such as a personal computer through the communication interface 27 and registered in the data memory 14, is examined. If the switch pattern S15 has been turned on, the processing proceeds to step 81 in which the stitch data of the given embroidery design from the external device is stored in the data memory 14 through the communication interface 27. Then, the processing proceeds to step 77 for executing a preparation processing for reading out the desired stitch data from the data memory 14 and thereafter returns to step 61. If step 80 is NO, the processing returns to step 73 in which the above described processing is repeated.

On the other hand, if the switch which has been turned on during the program menu screen pattern (FIG. 13a) is not the switch pattern S1, step 71 is NO and processings shown generally in step 82, i.e., various data setting processings corresponding to the other menu switch patterns S2–S12, are executed. In this step, as in the above-described "data input" mode, the screen pattern of the display 10 is switched in accordance with the selected menu so that various data can be set and selected. Description of details of these processings will be omitted. Thereafter, the processing returns to step 61.

Step 82 includes processings similar to those in step 75 but illustration of these processings in detail will be omitted.

If the running mode switch OMS has been turned on, either step 75 or 83 is judged YES and the operation mode is switched from the program mode to the running mode. Immediately after switching to the running mode, an initial processing of the running mode is executed (step 84).

In next step 85, the menu screen pattern of the running mode is diaplayed by the display 10. In next step 86, "matrix switching input processing subroutine" similar to the one described above is exceuted. In next step 87, whether or not the matrix switch flag is set to the switch-on state. i.e., whether or not any switch pattern in the running mode menu screen pattern has been turned on, is examined. If result is YES, the processing proceeds to step 88 in which processings according to the switch function number which has been turned on, i.e., the selected running mode menu, are executed. In this step, as in the above described "data input" mode, the screen pattern of the display 10 is switched in accordance with the selected running mode menu so that data can be set and selected in accordance with the selected running mode menu. The processing proceeds to step 85 in which the screen pattern is switched to the running mode menu.

An example of the displayed screen pattern of the display 10 in the running mode is shown in FIG. 13c. In FIG. 13c, a screen pattern concerning a mode for moving the embroidery frame and selecting a needle is shown. Switch patterns S16–S19 are one for designating movement of the embroidery frame and switch patterns S20–S28 are ones for selecting a needle.

If none of the menu switch patterns has been turned on in the running mode menu screen pattern, the processing proceeds from NO fo step 87 to step 89 in which whether or not the start switch has turned on by operation of the start/stop switch 26 is examined. If the start switch has been turned on, the processing returns to the main routine and enters the running routine (FIG. 5). If the start switch has not been turned on, the processing proceeds to step 90 in which whether or not the program mode switch PMS has been turned on is examined. if result is NO, the processing returns to the matrix switch input processing subroutine in step 86.

Upon turning on of the program mode switch PMS, the operation mode is switched from the running mode to the program mode and the processing proceeds to step 61 (FIG. 14a) in which the abive described routine for setting various data in the program mode is repeated.

Step 88 includes processings similar to steps 89 and 90, but detailed illustration of these processings will be omitted.

In the above described embodiment, when a predetermined number or more of the switch elements have been turned on in each switch element group of the matrix switch section 15 which elements are combined in the matrix switch group memory MSM and a switch relating to the switch pattern corresponding to the switch group is judged to have been turned on, this predetermined number is set at "1" so that, if at least one switch element in the switch element group has been turned on, the switch relating to the switch pattern corresponding to this switch group is judged to have been turned on. The invention is not limited to this but the predetermined number of the switch elements may be "2" or a greater number.

The input means for designating and inputting desired switch pattern need not be the matrix switch section 150 in the form of a transparent sheet as in the above described embodiment but other means may be employed.

As such input means, for example, optical designating members such as light pen and light gun which are used in combination with CRT display which performs display by the raster scan system may be used. In this case, as the judging means, an arrangement may be made so that, in synchronism with the scanning in the display 10, position in the screen pattern of the display 10 designated by the optical designating member such as light pen or light gun may be detected by scanning coordinates.

Alternatively, such input means may comprise means for generating cursor display in the screen pattern of the display and operation means (e.g., mouse) for moving this cursor display to a desired position. The input for designating the switch pattern is made by moving the cursor display to the position of the desired switch pattern.

Such input means may be one in which desired coordinate position in the screen pattern of the display is inputted as numerical value by operating a numerical value key.

Such input means may be other type of input means so long as it can designate a desired position in the screen pattern of the display.

In the above described embodiments, data setting is executed by software processing by the microcomputer system. Date setting may also be executed by a hardware circuit provided exclusively for this purpose.

In the above described embodiments, the data setting device according to the invention is incoporated integrally in the automatic embroidering machine. The data setting device however may be attached to an existing automatic embroidering machine as a separate unit.

The present invention is applicable not only to an automatic embroidering machine but also to other sewing machines.

As described above, according to the invention, setting and selection functions to be assigned to the function switches are switched and display for explaining the assigned functions is made in correspondence to each function switch. Accordingly, the operator can select a desired function in a very simple manner without memorizing the contents of the functions correpsonding to each function switch by heart. Besides, in a case where there is a large number of functions, the inconvenience that necessary description cannot be made sufficiently due to limit in the space for writing characters in the vicinity of the switch is eliminated and explanation of all functions can be made with the limited space of the display.

Further, according to the invention, a display for explaining a setting or selection function to be assigned to a function switch is made by a symbol corresponding to the function switch. This obviates the necessity for changing the display specification for explanation of functions depending upon language of a country in which embroidering machine is used so that a common type of embroidering machine can be used in any country and the manufacturing cost therefore is reduced. Besides. the operator can understand contents of the functions corresponding to each function switch by the symbol without his reading ability of the langage so that he can select a desired function very easily.

Furthermore, according to the invention, switch patterns can be arranged in a desired arrangement pattern by using a display capable of displaying desired characters and pictures, a desired switch pattern can be designated and inputted by unput means, and a switch relating to the designated switch pattern is judged to have been turned on. Accordingly, a multi-function switch can be constructed with a very simple design by changing the switch pattern arrangement pattern in the display variously so that various switch functions for setting and selecting various data in the embroidering machine can be realized.

What is claimed is:

1. A data setting device for an embroidering machine or other sewing machine having a number of functions for setting or selecting various data for specifying an embroidering or sewing operation, comprising:
    functions switches of a predetermined number which is smaller than the number of functions for setting or selecting various data;
    switching means for switching a setting or selection function to be assigned to each of the function switches in response to operation thereof, wherein said switching means is one of said function switches;
    function assignment means for assigning a predetermined setting or selection function to each of the function switches in accordance with the operation of said switching means;
    function display means for displaying, in accordance with the assignment by the function assignment means, a setting or selection function which is currently assigned to each of the function switches; and
    means for designating, in response to operation of one of said function switches, a processing corresponding to a setting or selection function which is currently assigned to said one of the function switches.

2. A data setting device as defined in claim 1 wherein said function display means has display frames corresponding to the function switches and a symbol representing the setting or selection function currently assigned to each one of the function switches is displayed in each of the display frames.

3. A data setting device for an embroidery machine or other sewing machine having a number of functions for setting or selecting various data, comprising:
    function switches of a predetermined number which is smaller that the number of functions for setting or selecting various data;
    switching means for switching a setting or selection function to be assigned to each of the function switches;
    function assignemnt means for assigning a predetermined setting or selection function to each of the function switches, in accordance with a switching operation by said switching means;
    graphic pattern generation means for generating graphic pattern data of predetermined patterns, said graphic pattern data comprising universal symbols symbolizing the respective functions;
    function display means for receiving, in accordance with the assignment by said function assignment means, graphic pattern data corresponding to the setting or selection function which is currently assigned to each of the function switches from said graphic pattern generation means and displaying a pattern based on said graphic pattern data in correspondence to each of the function switches; and
    means for designating, in response to operation of one of said function switches, a process correpsonding to a setting or selection function which is currently assigned to said one of the function switches.

4. A data setting device as defined in claim 3 wherein said switching means is one of said function switches.

5. A data setting device for an embroidery machine or other sewing machine for setting or selecting various data, comprising:
    a display, having a screen, for displaying letters and pictures;

a display control means for causing one or more switches to be displayed on the screen of said display in accordance with a previously programmed switch arrangement pattern;

input means for selectively designating a switch displayed on the screen of said display;

judging means for judging which switch on the screen of said display the input means has designated; and means for designating, in acordance with the judgement of said judging means, a processing corresponding to the function assigned to said switch.

6. A data setting device as defined in claim 5 wherein said input means comprises a matrix switch section in the form of a transparent sheet comprising switch elements disposed in matrix form on the front surface of said display.

7. A data setting device as defined in claim 6 wherein siad judging means combines into groups the switch elements disposed in correspondence to respective switch display position of the screen of said display determined in accordance with the switch arrangement pattern in said display and judges, when at least a predetermined number of the switch elements in the switch element group have been turned on, that a switch corresponding to the switch element group has been turned on.

8. A data setting device as defined in claim 5 wherein said display control means comprising a screen pattern memory storing a plurality of switch arrangement pattrerns and reads out one of the switch arrangement patterns selectively from the screen pattern memory so that the switch in the read out switch arrangement pattern is displayed by said display, and further wherein said juding means judges the designated switch by comparing and collating positions of respective switches in said one switch arrangement pattern selected by said display control means with the position on the screen of said display designated by said input means.

9. A data setting device as defined in claim 5 wherein said input means comprises an optical designating member for designating a desired position on the screen of said plurality.

10. A data setting device as defined in claim 5 wherein said input means comprises means for generating a cursor on the screen of said display and operations means for moving the cursor to a desired position on the screen of said display, a desired switch being designated by the position of said cursor.

* * * * *